JOHN B. LOW.

Improvement in Bridle Blinders for Horses.

No. 121,528. Patented Dec. 5, 1871.

Witnesses.
Geo. H. Norrard
H. A. Daniels

John B. Low, Inventor,
A. Whitman Attorney 121,528

UNITED STATES PATENT OFFICE.

JOHN B. LOW, OF HOMERVILLE, OHIO.

IMPROVEMENT IN BRIDLE-BLINDERS FOR HORSES.

Specification forming part of Letters Patent No. 121,528, dated December 5, 1871.

*To all whom it may concern:*

Be it known that I, JOHN B. LOW, of Homerville, in the county of Medina and in the State of Ohio, have invented an Improved Headstall with Blinders, for Horses and other Animals; and do hereby declare that the following description, taken in connection with the accompanying drawing, hereinafter referred to, forms a full and exact specification of the same, wherein I have set forth the nature and principles of my said improvement, by which my invention may be distinguished from others of a similar class, together with such parts as I claim and desire to secure by Letters Patent.

My invention relates to that class of devices which is made use of to govern unruly and breaching horses and other animals, and to prevent them from leaping over fences; and the nature thereof consists in providing a headstall with blinders having apertures in them, with sights constructed of sieve-wire, as herein described and shown.

Figure 1:
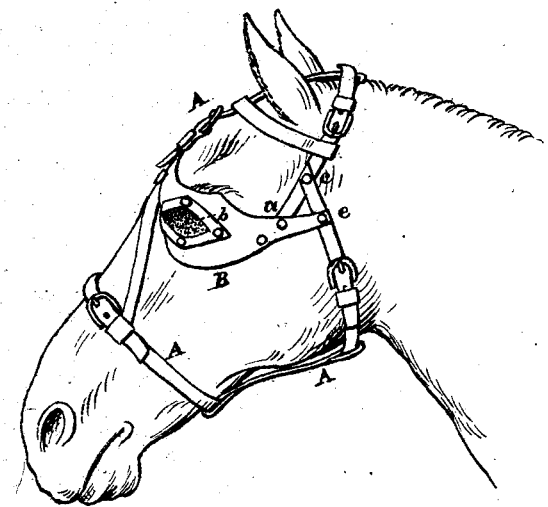
Figure 2:
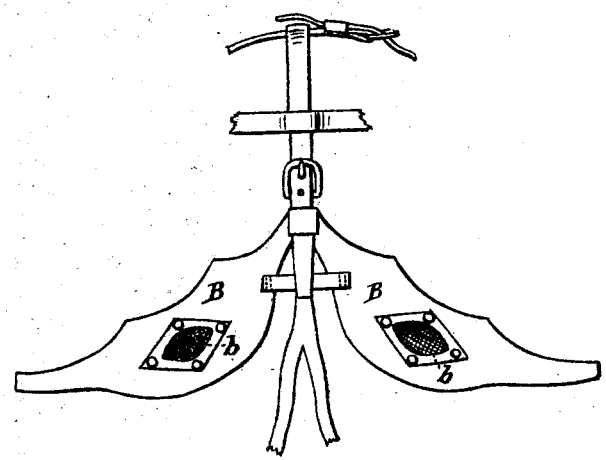

In the accompanying drawing, which illustrates my invention and forms a part of the specification thereof, Figure 1 is a view of my invention applied to the head of a horse. Fig. 2 is a front view of a detached portion of a headstall.

The construction and operation of my invention are as follows:

In the drawing referred to, A designates the straps of the headstall, and B the blinders. The latter are of the form shown in the drawing, and so adjusted that the lower parts rest against the face of the animal below the eyes, while the upper edge of the blinder pitches forward, leaving a space of about an inch and a half to the face. The extremities of straps *a c e*, being fastened in a triangular position, serve to hold the blinders in their proper position directly in front of the eyes. The sieve-wire, fixed in the apertures *b*, allows the animal to see sufficiently forward or downward for grazing purposes, but renders an upward view more difficult. It is not so liable to become broken as other material, and also allows the passage of air to the eyes.

Having described the construction and operation of my invention, I will indicate in the following clause what I claim and desire to secure by Letters Patent—that is to say:

In combination with a headstall, the blinders B with apertures occupied by sieve-wire, constructed and arranged as herein set forth, for the purpose specified.

In testimony that I claim the foregoing I have hereunto set my hand this 21st day of June, 1871.

JOHN B. LOW.

Witnesses:
 JONAS ZERKY,
 JOSEPH A. FUNK. (72)